(12) United States Patent
Franz

(10) Patent No.: US 8,381,979 B2
(45) Date of Patent: Feb. 26, 2013

(54) BAR CODE SYMBOL READING SYSTEM EMPLOYING EAS-ENABLING FACEPLATE BEZEL

(75) Inventor: Dwight L. Franz, Haddonfield, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 16 days.

(21) Appl. No.: 13/017,256

(22) Filed: Jan. 31, 2011

(65) Prior Publication Data

US 2012/0193422 A1    Aug. 2, 2012

(51) Int. Cl.
G06K 7/00    (2006.01)
G06K 7/10    (2006.01)

(52) U.S. Cl. ... 235/435; 235/439; 235/454; 235/462.01; 235/462.13; 235/462.43

(58) Field of Classification Search .................. 235/435, 235/439, 454, 462.01, 462.1, 462.13, 462.43–462.45, 235/472.01; 340/572.1–572.9
See application file for complete search history.

(56) References Cited

U.S. PATENT DOCUMENTS

| | | |
|---|---|---|
| 5,341,125 A | 8/1994 | Plonsky et al. |
| 5,517,195 A | 5/1996 | Narlow et al. |
| 5,796,339 A | 8/1998 | Drew et al. |
| 5,907,465 A | 5/1999 | Easter |
| 5,917,412 A | 6/1999 | Martin |
| 5,963,134 A | 10/1999 | Bowers et al. |
| 6,011,474 A | 1/2000 | Coffey et al. |
| 6,025,780 A | 2/2000 | Bowers et al. |
| 6,034,604 A | 3/2000 | Kaltner |
| 6,084,515 A | 7/2000 | Maitin et al. |
| 6,114,961 A | 9/2000 | Denholm et al. |
| 6,121,879 A | 9/2000 | Lian et al. |
| 6,169,483 B1 | 1/2001 | Ghaffari et al. |
| 6,181,249 B1 | 1/2001 | Maitin et al. |
| 6,281,796 B1 | 8/2001 | Canipe et al. |
| 6,359,562 B2 | 3/2002 | Rubin |
| 6,393,455 B1 | 5/2002 | Eilert et al. |
| 6,507,279 B2 | 1/2003 | Loof |

(Continued)

FOREIGN PATENT DOCUMENTS

| | | |
|---|---|---|
| EP | 0499582 A1 | 8/1992 |
| GB | 2286275 A | 8/1995 |

(Continued)

OTHER PUBLICATIONS

Communication of Examination Report Pursuant to Article 94(3) in EP Application No. 12153187.5 dated Oct. 1, 2012.

(Continued)

*Primary Examiner* — Thien M Le
*Assistant Examiner* — April Taylor
(74) *Attorney, Agent, or Firm* — Summa, Additon & Ashe, P.A.

(57) ABSTRACT

A method of and apparatus for incorporating primary components of an EAS system into hand-supportable and countertop-supportable bar code symbol reading systems having a housing with a light transmission window covered by an optically transparent faceplate having outer dimensions closely matched to the light transmission window. About the optically transparent faceplate, a faceplate bezel is mounted embodying a coil of electrically conductive wire having terminals connected to an electrical interface circuit, which is connected to a flexible EAS cable extending from the electrical interface circuit. The flexible EAS cable extends towards electrical drive circuitry associated with the EAS subsystem, for powering the coil during EAS tag deactivation operations controlled by the host computer system.

14 Claims, 11 Drawing Sheets

U.S. PATENT DOCUMENTS

| | | |
|---|---|---|
| 6,547,040 B2 | 4/2003 | Goodwin, III |
| 6,595,421 B2 * | 7/2003 | Detwiler ............... 235/462.14 |
| 6,619,549 B2 * | 9/2003 | Zhu et al. ............... 235/462.45 |
| 6,783,072 B2 | 8/2004 | Acosta et al. |
| 6,788,205 B1 | 9/2004 | Mason et al. |
| 6,854,647 B2 | 2/2005 | Collins, Jr. et al. |
| 7,051,943 B2 * | 5/2006 | Leone et al. ............ 235/462.45 |
| 7,068,172 B2 | 6/2006 | Yang et al. |
| 7,128,266 B2 * | 10/2006 | Zhu et al. ............... 235/462.22 |
| 7,132,947 B2 | 11/2006 | Clifford et al. |
| 7,170,414 B2 | 1/2007 | Clifford et al. |
| 7,303,128 B2 | 12/2007 | Canipe et al. |
| 7,374,092 B2 | 5/2008 | Acosta et al. |
| 7,495,564 B2 | 2/2009 | Harold et al. |
| 7,527,198 B2 | 5/2009 | Salim et al. |
| 7,575,162 B1 | 8/2009 | Malchak et al. |
| 7,619,527 B2 | 11/2009 | Friend et al. |
| 7,671,742 B2 | 3/2010 | Fallin et al. |
| 7,830,255 B2 | 11/2010 | Leone |
| 7,834,761 B2 | 11/2010 | Leone |
| 7,973,660 B2 | 7/2011 | Hall |
| 8,006,904 B2 | 8/2011 | Salim et al. |
| 8,011,579 B2 | 9/2011 | Acosta et al. |
| 8,138,921 B1 | 3/2012 | Cleeves et al. |
| 8,174,388 B2 | 5/2012 | Lian et al. |
| 8,191,780 B2 | 6/2012 | Daily |
| 2006/0208894 A1 | 9/2006 | Friend et al. |
| 2007/0063045 A1 * | 3/2007 | Acosta et al. ............ 235/462.13 |
| 2007/0210922 A1 * | 9/2007 | Clifford et al. ............ 340/572.3 |
| 2008/0314985 A1 * | 12/2008 | Kotlarsky et al. ......... 235/462.2 |
| 2012/0038480 A1 * | 2/2012 | Friend et al. ............. 340/572.3 |
| 2012/0139730 A1 * | 6/2012 | Kearney .................... 340/572.8 |

FOREIGN PATENT DOCUMENTS

| | | |
|---|---|---|
| WO | 9005968 A | 5/1990 |
| WO | 0184519 A2 | 11/2001 |

OTHER PUBLICATIONS

European Search Report for EP Application No. 12153187.5 dated Sep. 19, 2012.

* cited by examiner

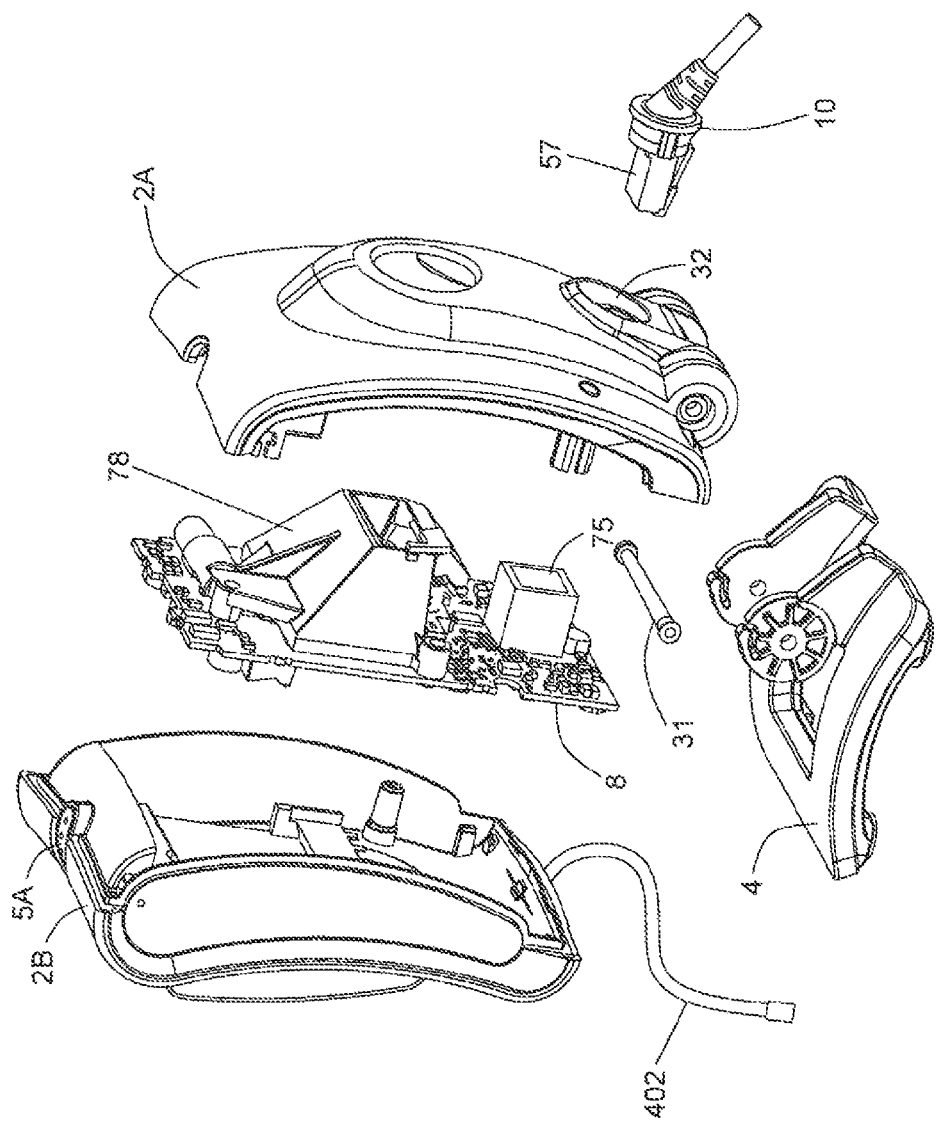

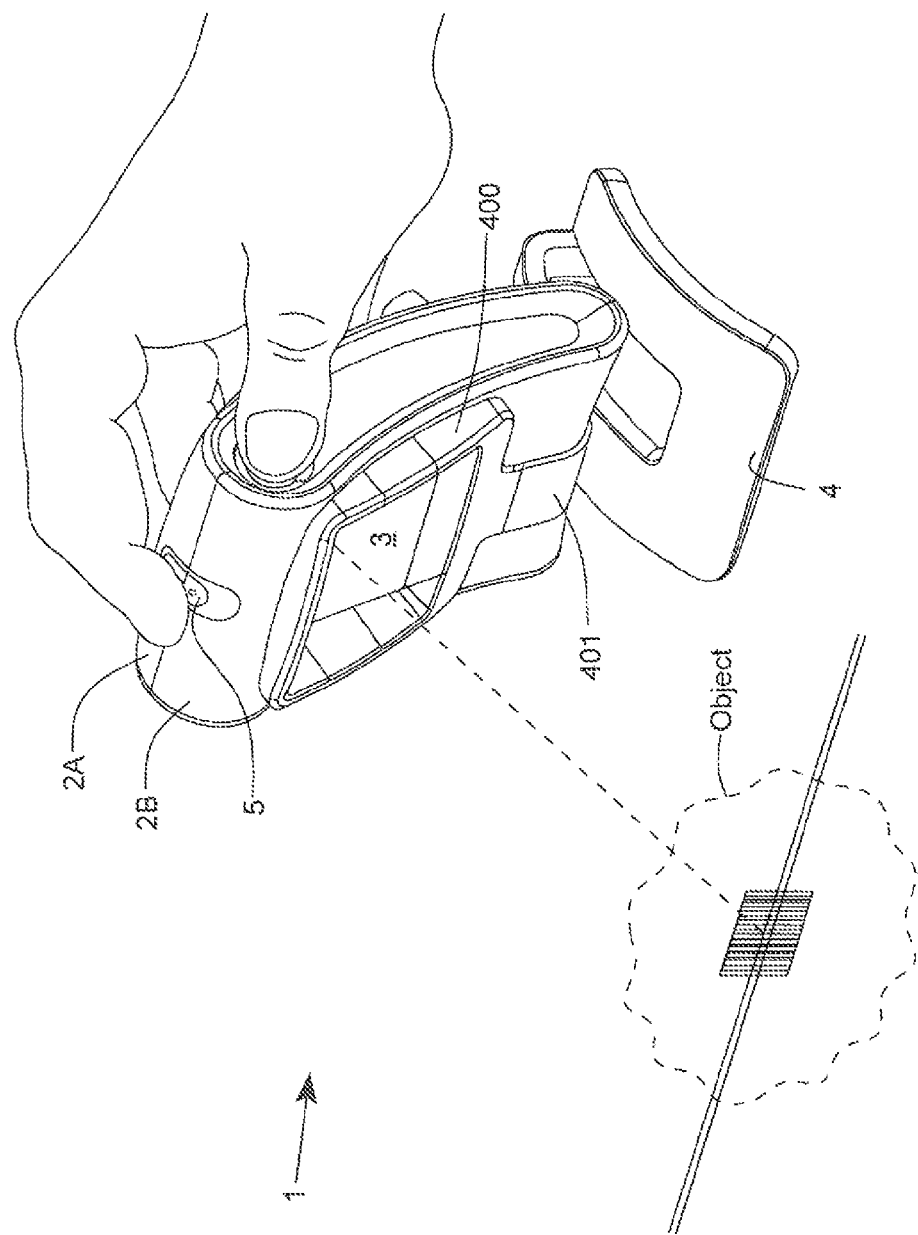

BAR CODE SYMBOL READING SYSTEM EMPLOYING EAS-ENABLING FACEPLATE BEZEL

BACKGROUND

1. Field of Disclosure

The present disclosure relates generally to an improved method of and apparatus for equipping hand-supportable bar code symbol reading systems with electronic article surveillance (EAS) tag deactivation capabilities.

2. Brief Description of the State of Knowledge in the Art

The use of bar code symbols for product and article identification is well known in the art. Presently, various types of bar code symbol scanners have been developed for reading bar code symbols at retail points of sale (POS).

Also, over the years, electronic article surveillance (EAS) methods have been developed to prevent shoplifting in retail stores or pilferage of books from libraries. Special tags are fixed to merchandise or books. These tags are removed or deactivated by the clerks when the item is properly bought or checked out at a POS station. At the exits of the store, a detection system sounds an alarm or otherwise alerts the staff when it senses "active" tags. For high-value goods that are to be manipulated by the patrons, wired alarm clips may be used instead of tags.

Currently, several major types of electronic article surveillance (EAS) systems have been developed, namely: magnetic-based EAS systems, also known as magneto-harmonic; acousto-magnetic based EAS systems, also known as magnetostrictive; and radio-frequency based EAS systems.

Magnetic-Based EAS Systems

In magnetic-based EAS systems, the tags are made of a strip of amorphous metal (metglas) which has a very low magnetic saturation value. Except for permanent tags, this strip is also lined with a strip of ferromagnetic material with a moderate coercive field (magnetic "hardness"). Detection is achieved by sensing harmonics and sum or difference signals generated by the non-linear magnetic response of the material under a mixture of low-frequency (in the 10 Hz to 1000 Hz range) magnetic fields. When the ferromagnetic material is magnetized, it biases the amorphous metal strip into saturation, where it no longer produces harmonics. Deactivation of these tags is therefore done with magnetization. Activation requires demagnetization. This type of EAS system is suitable for items in libraries since the tags can be deactivated when items are borrowed and re-activated upon return. It is also suitable for low value goods in retail stores, due to the small size and very low cost of the tags.

Acousto-Magnetic Based EAS Systems

These EAS systems are similar to magnetic-based EAS systems, in that the tags are made of two strips of metal, namely: a strip of magnetostrictive, ferromagnetic amorphous metal, and a strip of a magnetically semi-hard metallic strip, which is used as a biasing magnet (to increase signal strength) and to allow deactivation. These strips are not bound together, but are free to oscillate mechanically. Amorphous metals are used in such systems due to their good magneto-elastic coupling, which implies that they can efficiently convert magnetic energy to mechanical vibrations. The detectors for such tags emit periodic tonal bursts at about 58 kHz, the same as the resonance frequency of the amorphous strips[3]. This causes the strip to vibrate longitudinally by magnetostriction, and to continue to oscillate after the burst is over. The vibration causes a change in magnetization in the amorphous strip, which induces an AC voltage in the receiver antenna. If this signal meets the required parameters (correct frequency, repetition etc.) the alarm is activated.

When the semi-hard magnet is magnetized, the tag is activated. The magnetized strip causes the amorphous strip to respond much more strongly to the detectors, because the DC magnetic field given off by the strip offsets the magnetic anisotropy within the amorphous metal. The tag can also be deactivated by demagnetizing the strip, making the response small enough so that it will not be detected by the detectors. These tags are thicker than magnetic tags and are thus seldom used for books. However they are relatively inexpensive and have better detection rates (fewer false positives and false negatives) than magnetic tags.

Radio-Frequency Based EAS Systems

The Series 304 RF EAS label is essentially an LC tank circuit that has a resonance peak anywhere from 1.75 MHz to 9.5 MHz. The most popular frequency is 8.2 MHz. Sensing is achieved by sweeping around the resonant frequency and detecting the dip. Deactivation for 8.2 MHz label tags is achieved by detuning the circuit by partially destroying the capacitor. This is done by submitting the tag to a strong electromagnetic field at the resonant frequency which will induce voltages exceeding the capacitor's breakdown voltage, which is artificially reduced by puncturing the tags.

The Unsolved Problem

Despite numerous advances in EAS systems over the past few decades, enabling conventional bar code symbol readers with EAS capabilities, at the time of manufacture, as well after purchase during upgrading efforts, has been both a component and labor intensive activity.

Therefore, there still remains a great need in the art for an improved method of and apparatus for enabling hand-supportable and countertop-supportable bar code symbol reading systems with electronic article surveillance (EAS) capabilities, while avoiding the shortcomings and drawbacks of prior art systems and methodologies.

OBJECTS AND SUMMARY

Accordingly, a primary object of the present disclosure is to provide an improved method of and apparatus for enabling hand-supportable and countertop-supportable bar code symbol reading systems with electronic article surveillance (EAS) capabilities, while avoiding the shortcomings and drawbacks of prior art systems and methodologies.

Another object of the present invention is to provide such an improved method of and apparatus for incorporating primary components of an EAS system into hand-supportable and countertop-supportable bar code symbol reading systems.

Another object is to provide such apparatus in the form of a hand-supportable bar digital-imaging bar code symbol reading system having an EAS coil and cable interface circuitry integrated within a faceplate bezel structure that is installed about its imaging window.

Another object is to provide such an apparatus in the form of a hand-supportable laser-scanning bar code symbol reading system having an EAS coil and cable interface circuitry integrated within a faceplate bezel structure that is installed about its scanning window.

Another object is to provide an EAS cable assembly that incorporates one or more EAS antenna coils embedded into recesses formed within a faceplate bezel that is adapted for easy application about the faceplate (i.e. window) of a hand-supportable or countertop-supportable bar code symbol reading system.

Another object is to provide a method of incorporating a multi-component EAS subsystem into a hand-supportable or countertop-supportable bar code symbol reading system in a part and labor intensive activity.

Another object is to provide a way of reducing the number of parts and assembly steps required to incorporate an EAS subsystem into a hand-supportable or countertop-supportable bar code symbol reading system.

Another object is to provide a faceplate bezel adapted for application about the scanning or imaging window of a hand-supportable and/or countertop-supportable bar code symbol reader, and having a recess within which an EAS antenna coil fabricated to specification of a cable vendor, can be embedded and delivered as an EAS subassembly prequalified and ready for installation on the bar code symbol deployed in the field.

Another object of the present invention is to provide an EAS assembly that reduces the number of assembly steps and parts that must be maintained in inventory.

Another object of the present invention is to provide a prequalified EAS cable assembly that incorporates EAS antenna coils (i.e. wire loops) embedded into a finished faceplate bezel that is applied about the scanning or imaging window of a bar code symbol reader at the time of manufacture of the bar code symbol reader, and after the bar code symbol reader has been manufactured and deployed in the field.

Another object of the present invention is to provide a faceplate bezel that is designed to receive any prequalified EAS cable assembly that has been fabricated to specification by a cable vendor, and which can be assembled together as an EAS-enabling faceplate bezel in a single procedural step on the assembly line.

Another object of the present invention is to provide an EAS-enabling faceplate bezel structure that is quickly mounted about imaging or scanning window of a hand-supportable and countertop-supportable bar code symbol reading system, using simple threaded fasteners or other suitable fastening means.

Another object of the present invention is to provide an EAS-enabling faceplate bezel and cable assembly that can be used to upgrade any modular-type hand-supportable and countertop-supportable bar code symbol reading system with EAS functionality in a quick and easy manner, without re-designing the bar code symbol reading system.

Another object is to provide a method of providing a bar code symbol reading system with EAS tag deactivation capabilities.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein:

FIG. 2A is a first perspective exploded view of the digital-imaging based bar code symbol reading system of the illustrative embodiment depicted in FIG. 1, showing its printed circuit (PC) board assembly arranged between the front and rear portions of the system housing, with the hinged base being pivotally connected to the rear portion of the system housing by way of an axle structure;

FIG. 5 is a perspective view of the digital-imaging based bar code symbol reading system of FIG. 1, shown operated in its manually-triggered hand-supported mode of operation;

DETAILED DESCRIPTION OF THE ILLUSTRATIVE EMBODIMENTS

Figure 1:
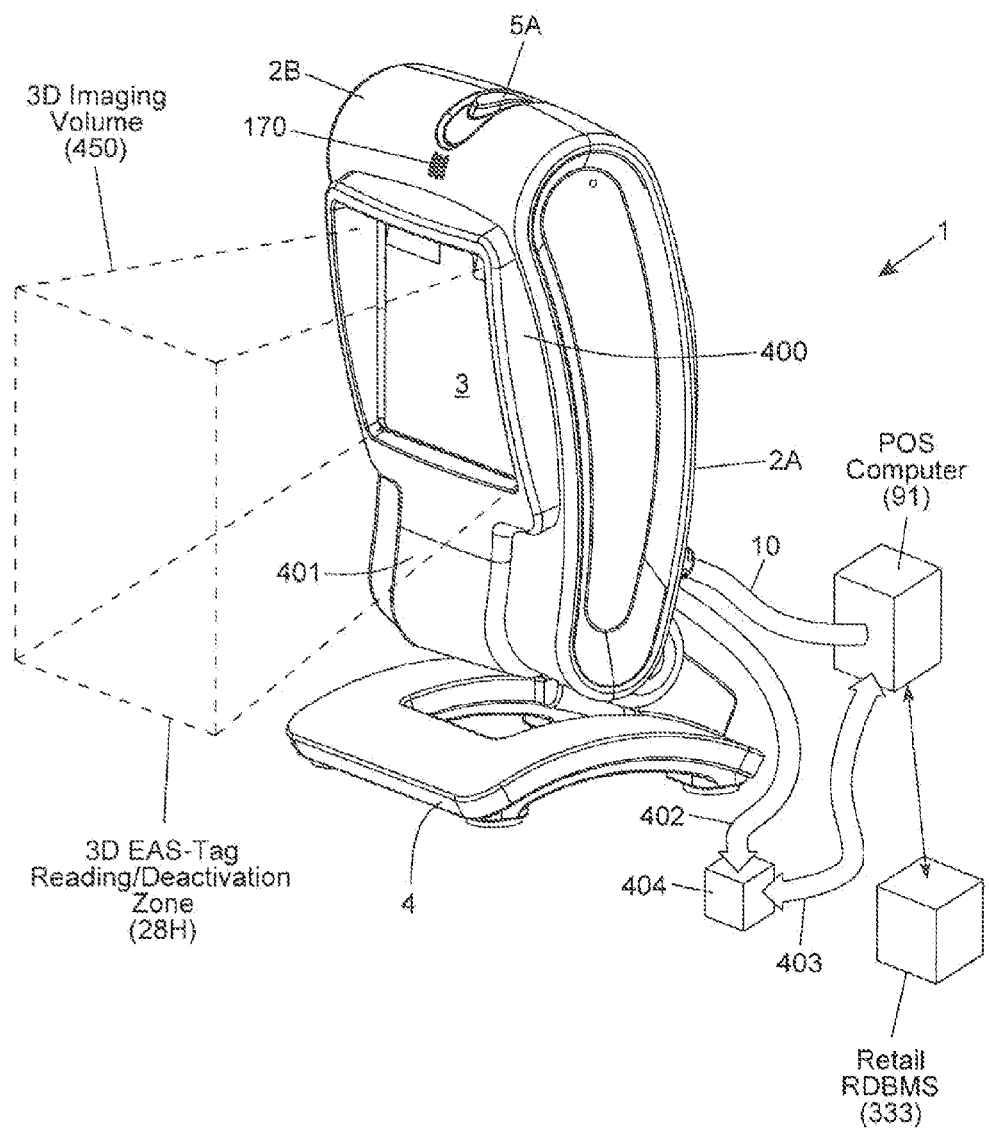
FIG. 1 is a perspective view of an illustrative embodiment of a hand-supportable/countertop-supportable digital-imaging based bar code symbol reading system incorporating an EAS subsystem within a faceplate bezel structure installed about its imaging window, and shown being operated in its automatically-triggered counter-top supported mode of bar code symbol reading operation.

Referring to the figures in the accompanying Drawings, the various illustrative embodiments of the apparatus and methodologies will be described in great detail, wherein like elements will be indicated using like reference numerals.

Figure 6A:
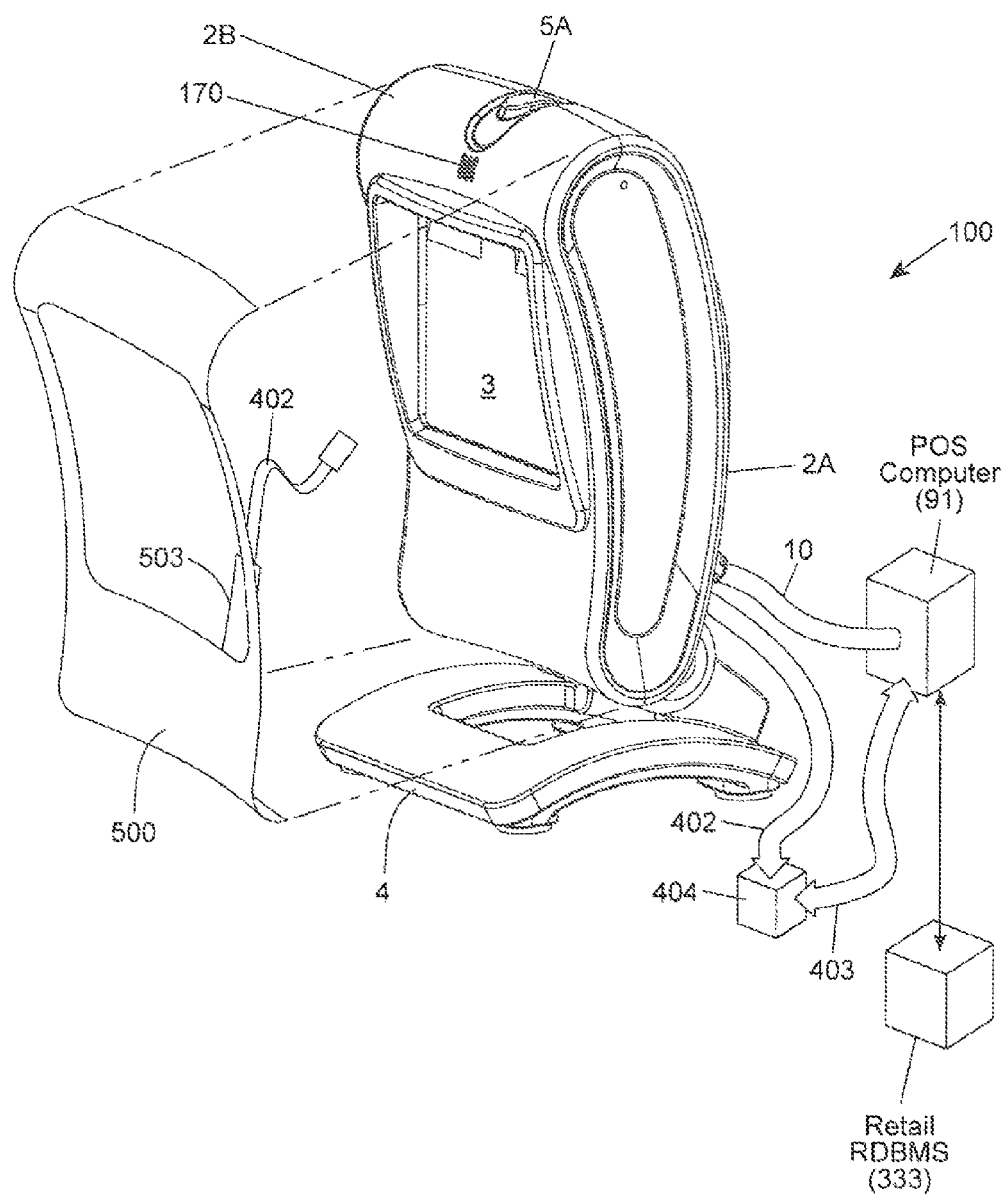
FIG. 6A is a perspective view of a laser-scanning bar code symbol reading system supporting an ultra-thin EAS-enabling bezel faceplate realized as a flexible printed circuit, and applied about the laser scanning window (i.e. faceplate) of the system.

In general, the EAS-enabling faceplate bezels can be mounted on bar code symbol reading systems of various designs. For purposes of illustration, FIGS. 1 through 3 show a first illustrative embodiment of an EAS-enabling faceplate bezel mounted about the imaging window of a digital-imaging bar code symbol reading system. FIGS. 6A through 7 show a second illustrative embodiment of an EAS-enabling faceplate bezel mounted about the scanning window of a laser scanning bar code symbol reading system. These illustrative embodiments will now be described in greater technical detail.

First Illustrative Embodiment of the EAS-Enabled Bar Code Symbol Reading System

Referring now to FIGS. 1 through 3, a first illustrative embodiment of an EAS-enabling digital-imaging bar code symbol reading system 1 will be described in detail.

Figure 2B:
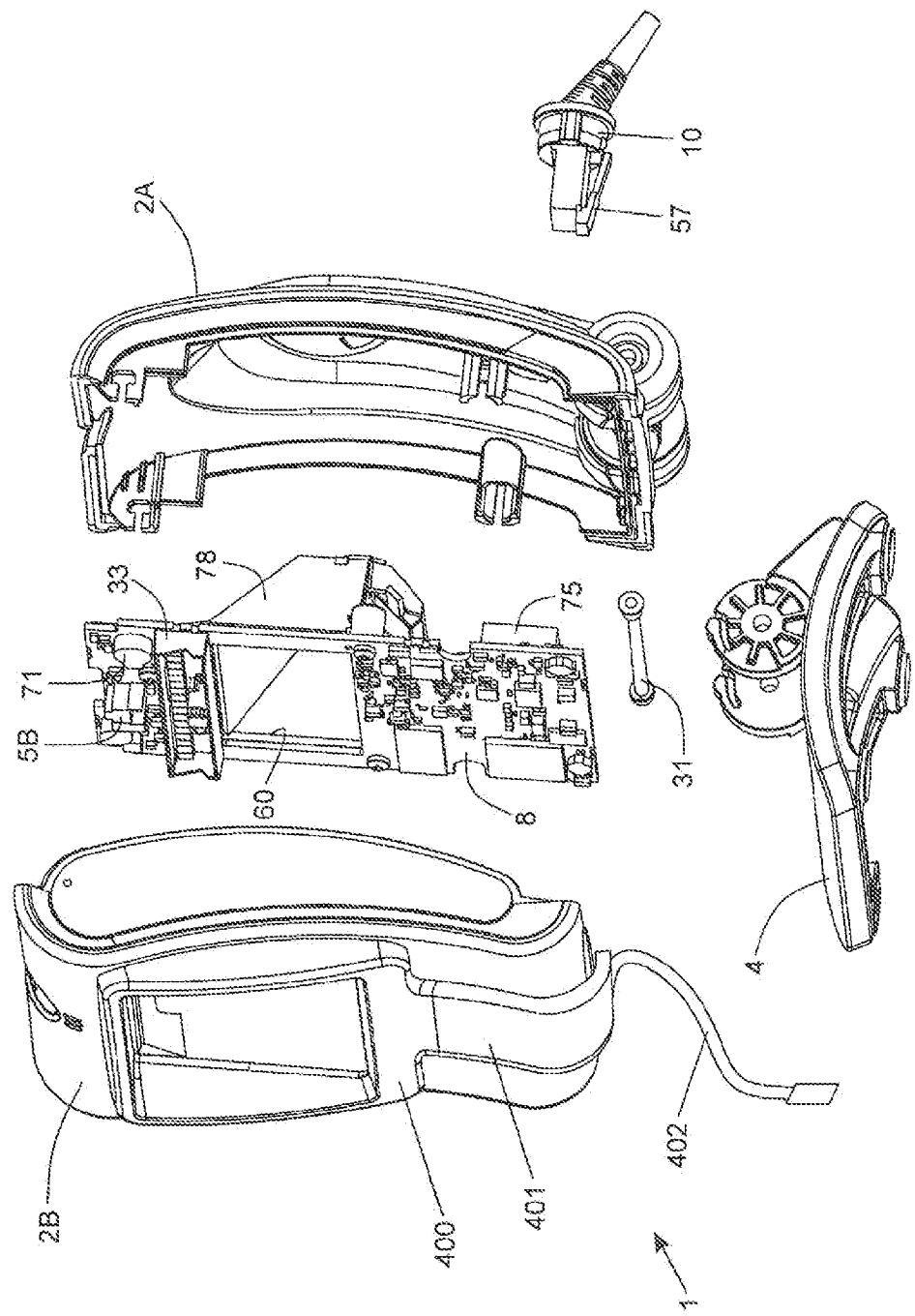
FIG. 2B is a second perspective/exploded view of the digital-imaging based bar code symbol reading system of the illustrative embodiment shown in FIG. 1.
Figure 3:
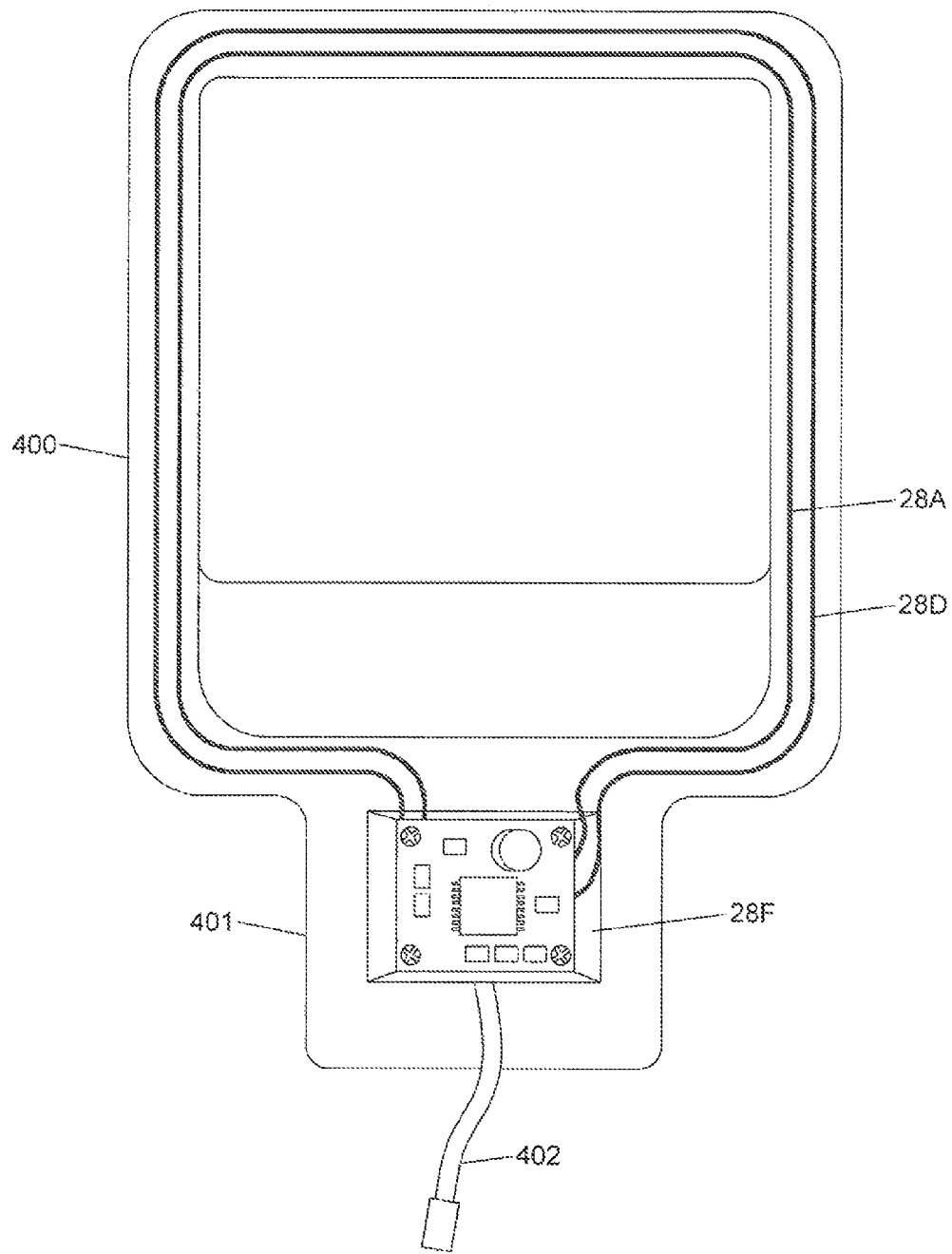
FIG. 3 is a plan view of the rear side of a first illustrative embodiment of the EAS-enabling bezel faceplate incorporating components of the EAS subsystem, and shown removed from its digital-imaging based bar code symbol reading system of FIG. 1.

As shown in FIGS. 1, 2A and 2B, the digital-imaging bar code symbol reading system 1 comprises: a hand-supportable housing 2 having (i) a front housing portion 2B with a window aperture 6 and an imaging window panel 3 installed therein; and (ii) a rear housing portion 2A. As shown, a single PC board based optical bench 8 (having optical subassemblies mounted thereon) is supported between the front and rear housing portions 2A and 3B which, when brought together, form an assembled unit. A base portion 4 is connected to the assembled unit by way of a pivot axle structure 31 that passes through the bottom portion of the imager housing and the base portion so that the hand-supportable housing and base portion are able to rotate relative to each other. The plug portion 57 of the host/imager interface cable 10 passes through a port 32 formed in the rear of the rear housing portion, and interfaces with connector 75 mounted on the PC board 8. Also, shown in FIG. 1, flexible EAS cable 402 is connected to interface cable 10 using clips or like fasteners all the way to the EAS module 404, and EAS cable 403 interfacing the EAS module 404 and the host computer 91 at the POS station.

In FIG. 1, the digital-imaging based system 1 is shown being used in a hands-free, countertop-supportable mode of automatically-activated operation, whereas in FIG. 5, the digital-imaging based system 1 is shown being used in a hand-supported manually triggered mode of operation. It is understood, however, that the system also supports a hand-supportable automatically-activated mode of operation, as well.

Figure 4A:
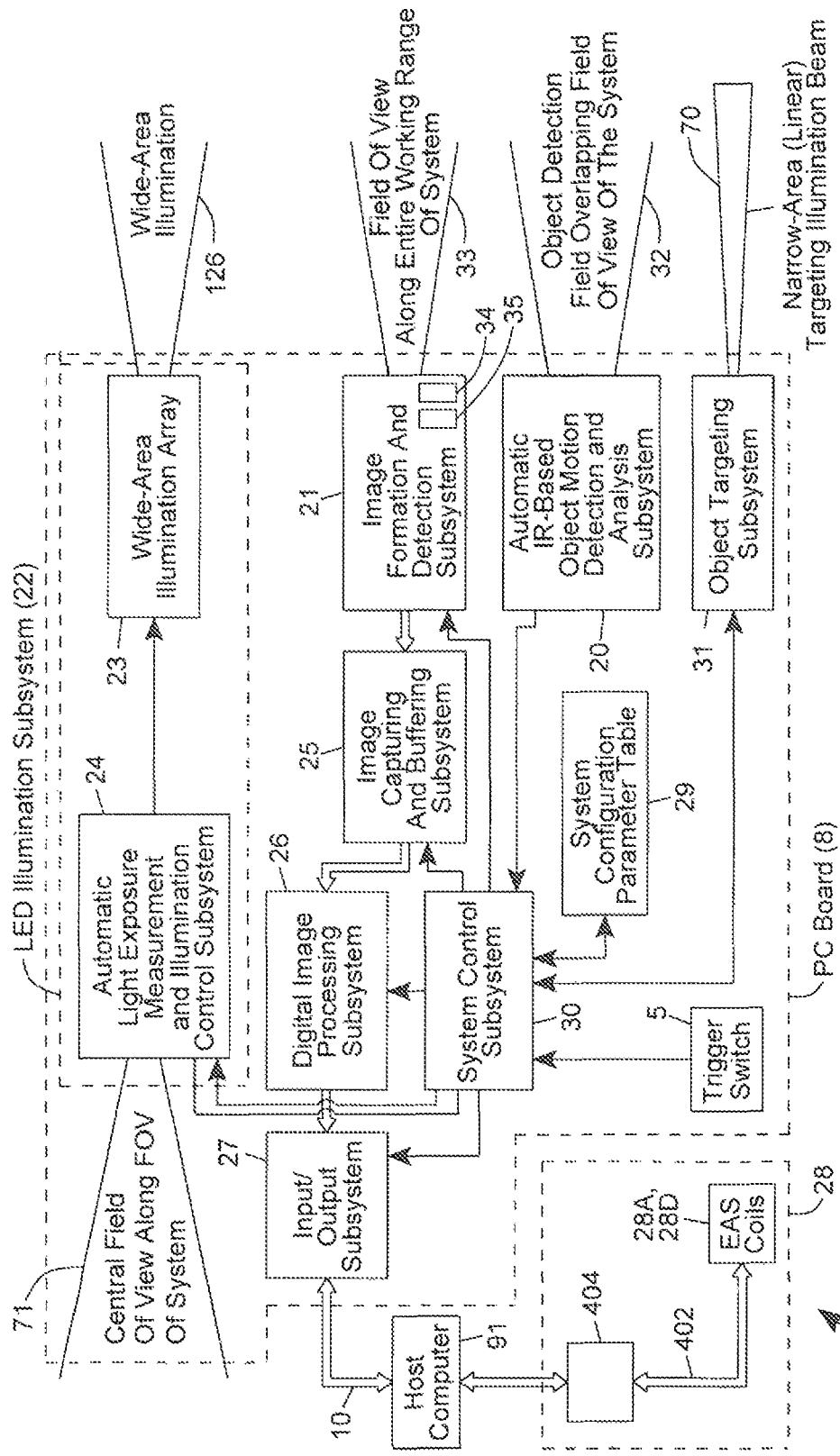
FIG. 4A is a schematic block diagram describing the major system components of the digital-imaging based bar code symbol reading system illustrated in FIGS. 1 through 3.
Figure 4B:
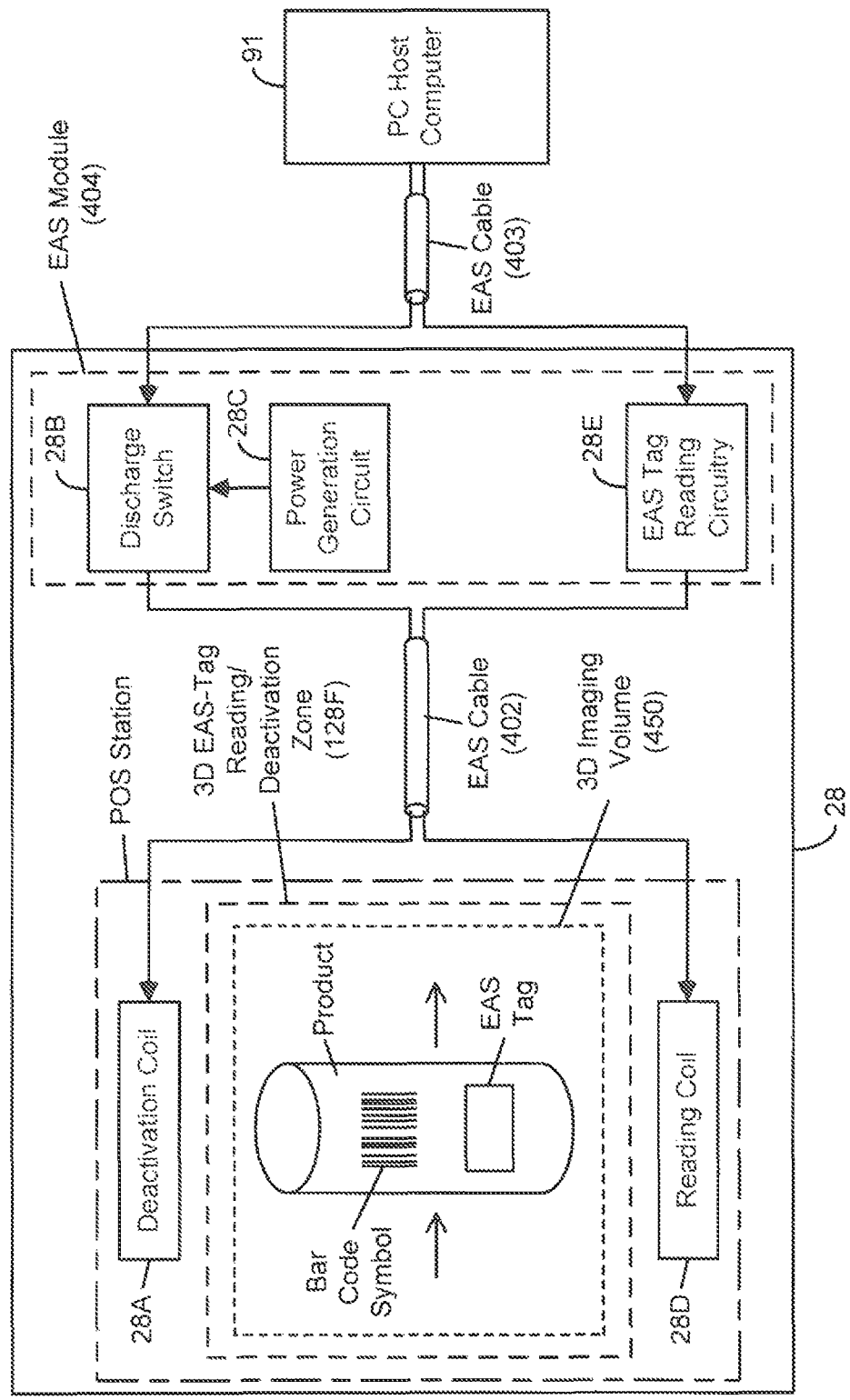
FIG. 4B is a schematic block diagram of the digital-imaging based bar code symbol reading system of FIG. 1, showing the 3D imaging volume and 3D EAS field(s) supported by the system when equipped with the EAS-enabling bezel faceplate of FIG. 3, installed about its imaging window.

As shown in FIGS. 4A and 4B, the digital-imaging based code symbol reading system 1 comprises a number of sub-system components, namely: an image formation and detection (i.e. camera) subsystem 21 having image formation (camera) optics 34 for producing a field of view (FOV) upon an object to be imaged and a CMOS or like area-type image detection array 35 for detecting imaged light reflected off the object during illumination operations in an image capture mode in which at least a plurality of rows of pixels on the image detection array are enabled; a LED-based illumination subsystem 22 employing an LED illumination array 32 for producing a field of narrow-band wide-area illumination 26 within the entire FOV 33 of the image formation and detection subsystem 21, which is reflected from the illuminated object and transmitted through a narrow-band transmission-type optical filter 40 realized within the hand-supportable housing and detected by the image detection array 35, while all other components of ambient light are substantially rejected; an object targeting illumination subsystem 31 for generating a narrow-area targeting illumination beam into the FOV, as show in FIG. 5, to help allow the user to align bar code symbols within the active portion of the FOV where imaging occurs; an IR-based object motion detection and analysis subsystem 20 for producing an IR-based object detection field 32 within the FOV of the image formation and detection subsystem 21; an automatic light exposure measurement and illumination control subsystem 24 for controlling the operation of the LED-based illumination subsystem 22; an image capturing and buffering subsystem 25 for capturing and buffering 2-D images detected by the image formation and detection subsystem 21; a digital image processing subsystem 26 for processing 2D digital images captured and buffered by the image capturing and buffering subsystem 25 and reading 1D and/or 2D bar code symbols represented therein; and an input/output subsystem 27 for outputting processed image data and the like to an external host system or other information receiving or responding device; a system memory 29 for storing data implementing a configuration table 29A of system configuration parameters (SCPs); a retail RDBMS server 333 interfaced with a transceiver, for supporting POS product pricing and related POS services at the host computing system to which the bar code symbol reading system is interfaced; an electronic article surveillance (EAS) subsystem 28 for generating an EAS tag deactivation field and an EAS tag detection field, under the supervision of control subsystem 30; and an EAS-enabling faceplate bezel 400 embodying the primary subcomponents of the EAS subsystem 28 (e.g. antenna coils 28A, 28D and cable interface circuit 28F), and allowing a flexible EAS cable 402 to pass beneath the system and piggy-back onto the scanner cable assembly provided in the lower rear portion of the bar code symbol reader, and interface with EAS module 404, as shown in FIG. 4B.

The primary function of the object targeting subsystem 31 is to automatically generate and project visible linear-targeting illumination beam across the central extent of the FOV of the system in response to either (i) the automatic detection of an object during hand-held imaging modes of system operation, or (ii) manual detection of an object by an operator when s/he manually actuates the manually-actuatable trigger switch 5A. In order to implement the object targeting subsystem 31, the OCS assembly 78 also comprises a fourth support structure for supporting the pair of beam folding mirrors above a pair of aperture slots, which in turn are disposed above a pair of visible LEDs arranged on opposite sites of the FOV optics 34 so as to generate a linear visible targeting beam 70 that is projected off the second FOV folding 75 and out the imaging window 3, as shown and described in detail in US Patent Publication No. US20080314985 A1, incorporated herein by reference in its entirety.

The primary function of the object motion detection and analysis subsystem 20 is to automatically produce an object detection field 32 within the FOV 33 of the image formation and detection subsystem 21, to detect the presence of an object within predetermined regions of the object detection field 32, as well as motion and velocity information about objects therewithin, and to generate control signals which are supplied to the system control subsystem 30 for indicating when and where an object is detected within the object detection field of the system. As shown in FIG. 2B, IR LED 90A and IR photodiode 90B are supported in the central lower portion of the optically-opaque structure 133, below the linear array of LEDs 23. The IR LED 90A and IR photodiode 90B are used to implement the object motion detection subsystem 20.

The image formation and detection subsystem 21 includes image formation (camera) optics 34 for providing a field of view (FOV) 33 upon an object to be imaged and a CMOS area-type image detection array 35 for detecting imaged light reflected off the object during illumination and image acquisition/capture operations, and generating 2D digital images of objects in the FOV, having high-resolution pixel content.

The primary function of the LED-based illumination subsystem 22 is to produce a wide-area illumination field 36 from the LED array 23 when an object is automatically detected within the FOV. Notably, the field of illumination has a narrow optical-bandwidth and is spatially confined within the FOV of the image formation and detection subsystem 21 during modes of illumination and imaging, respectively. This arrangement is designed to ensure that only narrow-band illumination transmitted from the illumination subsystem 22, and reflected from the illuminated object, is ultimately transmitted through a narrow-band transmission-type optical filter subsystem 40 within the system and reaches the CMOS area-type image detection array 35 for detection and processing, whereas all other components of ambient light collected by the light collection optics are substantially rejected at the image detection array 35, thereby providing improved SNR, thus improving the performance of the system.

The narrow-band transmission-type optical filter subsystem 40 is realized by (1) a high-pass (i.e. red-wavelength reflecting) filter element embodied within or at the imaging window (i.e. optically transparent faceplate) 3, and (2) a low-pass filter element mounted either before the CMOS area-type image detection array 35 or anywhere after beyond the high-pass filter element, including being realized as a dichroic mirror film supported on at least one of the FOV folding mirrors 74 and 75, shown in FIGS. 2A and 2B.

As shown in FIG. 2B, the linear array of LEDs 23 is aligned with an illumination-focusing lens structure 51 embodied or integrated within the upper edge of the imaging window 3. Also, the light transmission aperture 60 formed in the PC board 8 is spatially aligned within the imaging window 3 formed in the front housing portion 2A. The function of illumination-focusing lens structure 51 is to focus illumination from the single linear array of LEDs 23, and to uniformly illuminate objects located anywhere within the working distance of the FOV of the system.

As shown in FIG. 2B, an optically-opaque light ray containing structure 133 is mounted to the front surface of the PC board 8, about the linear array of LEDs 23. The function of the optically-opaque light ray containing structure 133 is to prevent transmission of light rays from the LEDs to any surface other than the rear input surface of the illumination-focusing lens panel 3, which uniformly illuminates the entire FOV of the system over its working range. When the front and rear housing panels 2B and 2A are joined together, with the PC board 8 disposed therebetween, the illumination-focusing lens panel 3 sits within slanted cut-aways formed in the top surface of the side panels, and illumination rays produced from the linear array of LEDs 23 are either directed through the rear surface of the illumination-focusing lens panel 3 or absorbed by the black colored interior surface of the structure 133.

As shown in FIGS. 2A and 2B the optical component support (OCS) assembly 78 comprises: a first inclined panel for supporting the FOV folding mirror above the FOV forming optics, and a second inclined panel for supporting the second FOV folding mirror above the light transmission aperture 60. With this arrangement, the FOV employed in the image formation and detection subsystem 21, and originating from optics supported on the rear side of the PC board 8, is folded twice, in space, and then projected through the light transmission aperture and out of the imaging window of the system.

The automatic light exposure measurement and illumination control subsystem 24 performs two primary functions: (1) to measure, in real-time, the power density [joules/cm] of photonic energy (i.e. light) collected by the optics of the system at about its image detection array 35, and to generate auto-exposure control signals indicating the amount of exposure required for good image formation and detection; and (2) in combination with the illumination array selection control signal provided by the system control subsystem 30, to automatically drive and control the output power of the LED array 23 in the illumination subsystem 22, so that objects within the FOV of the system are optimally exposed to LED-based illumination and optimal images are formed and detected at the image detection array 35. The OCS assembly 78 also comprises a third support panel for supporting the parabolic light collection mirror segment 79 employed in the automatic exposure measurement and illumination control subsystem 24. Using this mirror 78, a narrow light collecting FOV is projected out into a central portion of the wide-area FOV 33 of the image formation and detection subsystem 21 and focuses collected light onto photo-detector, which is operated independently from the area-type image sensing array 35.

The primary function of the image capturing and buffering subsystem 25 is (i) to detect the entire 2-D image focused onto the 2D image detection array 35 by the image formation optics 34 of the system, (ii) to generate a frame of digital pixel data for either a selected region of interest of the captured image frame, or for the entire detected image, and then (iii) to buffer each frame of image data as it is captured. Notably, in the illustrative embodiment, the system has both single-shot and video modes of imaging. In the single shot mode, a single 2D image frame is captured during each image capture and processing cycle, or during a particular stage of a processing cycle. In the video mode of imaging, the system continuously captures frames of digital images of objects in the FOV. These modes are specified in further detail in US Patent Application Publication No. US20080314985 A1, incorporated herein by reference in its entirety.

The primary function of the digital image processing subsystem 26 is to process digital images that have been captured and buffered by the image capturing and buffering subsystem 25, during modes of illumination and operation. Such image processing operations include image-based bar code decoding methods as described in U.S. Pat. No. 7,128,266, incorporated herein by reference.

The primary function of the EAS-enabling faceplate bezel 400 is to incorporate (e.g. embody) primary subcomponents (e.g. coils 28B, 28D and circuit 28F) of the EAS subsystem 28, which is disposed external to the system housing, and quickly equip the digital imaging bar code reading system with EAS tag deactivation (and possibly detecting) capabilities. This is achieved by simply mounting the EAS-enabling faceplate bezel 400 about the imaging window 3, routing the EAS cable 402 back to the host computing system 91, along with the scanner/reader interface cable 10.

In FIG. 3, the primary components of the EAS subsystem 28 are shown as comprising: a deactivation coil 28A for generating a EAS tag deactivation field and a detection coil 28B for generating a EAS tag detection field, both within a 3D EAS tag detection/deactivation zone 28F that spatially encompasses the 3D imaging volume 450 of the bar code symbol reading system, as shown in FIG. 1; and a EAS signal supply and processing unit or module 404 containing a discharge switch 28B, a power generation circuit 28C and a EAS tag detection circuit, in a compact manner, and supporting (i) a first interface with the host computing system 91 realized using a flexible EAS cable 403, and (ii) a second interface with the deactivation coil 28A and the detection coil 28D, embedded within the EAS-enabling faceplate bezel structure 400, and realized using a flexible EAS cable 402 extending between the base portion 401 of the EAS-enabling faceplate bezel structure 400 and the host computing system 91.

The EAS signal supply and processing module 404 further comprises a standard AC power input and power supply circuitry well known in the art. During operation, the power generation circuit 28C supplies the deactivation coil 28A with electrical current through the discharge switch 28C, which is controlled by the host computer system in a conventional manner. The EAS tag detection/reading circuit 28E processes electrical signals detected by the EAS detection coil 28D, and generates data signals indicative of the detected EAS tag in the EAS detection/deactivation zone 28H.

The primary function of the EAS tag detection field is to automatically read EAS tags applied to priced product items, when such product items are passed through the 3D EAS tag reading/deactivation zone. The primary function of the EAS tag deactivation field is to automatically deactivate EAS tags applied to purchased product items, when such purchased items are passed through the 3D EAS tag reading/deactivation zone 28H.

The primary function of the input/output subsystem 27 is to support universal, standard and/or proprietary data communication interfaces with host system 91, and output processed image data and the like to such external host systems or devices by way of such interfaces. Examples of such interfaces, and technology for implementing the same, are given in U.S. Pat. No. 6,619,549, incorporated herein by reference in its entirety.

The primary function of the system control subsystem 30 is to provide some predetermined degree of control, coordination and/or management signaling services to each subsystem component integrated within the system, as shown. While this subsystem can be implemented by a programmed microprocessor, in the preferred embodiments of the present disclosure, this subsystem is implemented by the three-tier software architecture supported on micro-computing platform shown in FIG. 3, and described in U.S. Pat. No. 7,128,266, and elsewhere hereinafter.

The primary function of the manually-activatable trigger switch 5A integrated with the housing is to enable the user, during a manually-triggered mode of operation, to generate a control activation signal (i.e. trigger event signal) upon manually depressing the same (i.e. causing a trigger event), and to provide this control activation signal to the system control subsystem 30 for use in carrying out its complex system and subsystem control operations, described in detail herein.

The primary function of the system configuration parameter (SCP) table 29A in system memory is to store (in non-volatile/persistent memory) a set of system configuration and control parameters (i.e. SCPs) for each of the available features and functionalities, and programmable modes of supported system operation, and which can be automatically read and used by the system control subsystem 30 as required during its complex operations. Notably, such SCPs can be dynamically managed as taught in great detail in co-pending US Patent No. US20080314985 A1, incorporated herein by reference.

Second Illustrative Embodiment of the EAS-Enabled Bar Code Symbol Reading System FIG. 6A shows a hand-supportable/countertop-supportable laser-scanning bar code symbol reading system 100 supporting an ultra-thin EAS-enabling bezel faceplate 500 realized as a custom-designed flexible printed circuit (PC) formed on a flexible substrate, applied about the laser scanning window of the system. The bar code symbol reading system 100 is interfaced with a POS host computer 91 by way of flexible scanner interface and EAS cables 402 and 403, respectively. As shown, the POS host computer 91 is interfaced with a retail RDBMS server 333 storing database records on all consumer products offered for sale in the retail environment, including product prices and other types of product-related information.

Figure 6B:
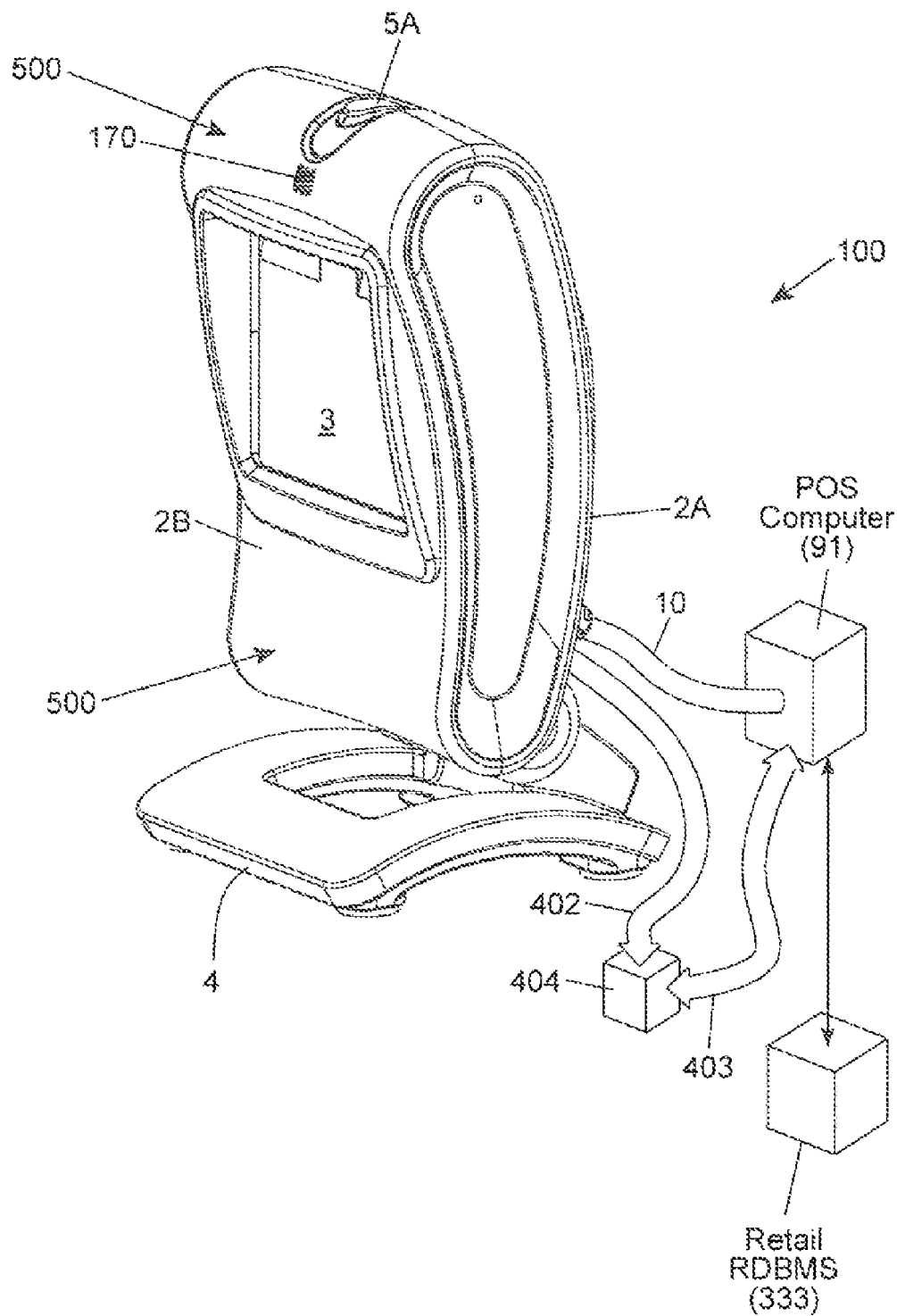
FIG. 6B is a perspective view of the EAS-enabling bezel faceplate of the second illustrative embodiment shown in FIG. 7, shown being applied to the front surface of the laser-scanning bar code symbol reading system as shown in FIG. 6A.
Figure 7:
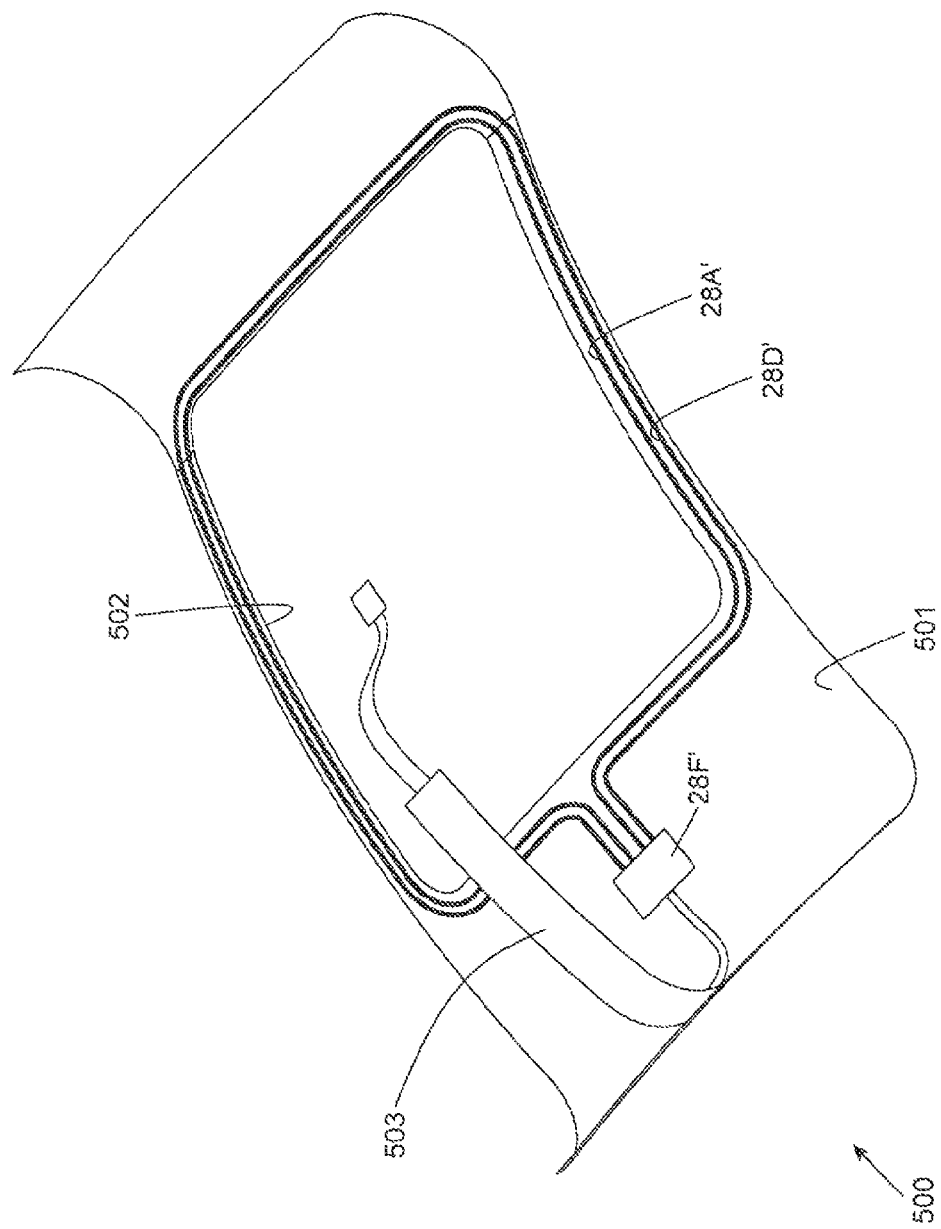
FIG. 7 is a perspective view of the rear surface of the second illustrative embodiment of the EAS-enabling bezel faceplate shown in FIGS. 6A and 6B, and supporting the realization of deactivation and detection coils and a cable interface circuit, realized on its flexible printed circuit (PC) substrate, molded to the front surface counter of the system housing about its laser scanning window.

FIG. 6B shows the EAS-enabling bezel faceplate 500 being applied to the front surface of the laser-scanning bar code symbol reading system as shown in FIG. 6A. Preferably, a suitable adhesive is applied to the perimeter regions of the rear surface of the flexible EAS-enabling faceplate bezel 500, and then the faceplate bezel is applied to the surface of the housing about the faceplate (i.e. laser scanning window). Suitable pressure is applied to the faceplate bezel to ensure strong bonding between the applied adhesive, the faceplate bezel and the front surface of the housing about the laser scanning window.

FIG. 7 shows the rear surface of the second illustrative embodiment of the EAS-enabling bezel faceplate 500. As shown, the EAS tag deactivation and detection coils 28B', 28D' and a cable interface circuit 28F' are realized in the rear surface of the flexible printed circuit (PC) substrate, which is molded to the front surface counter of the system housing 2B about its laser scanning window (i.e. faceplate).

Figure 8:
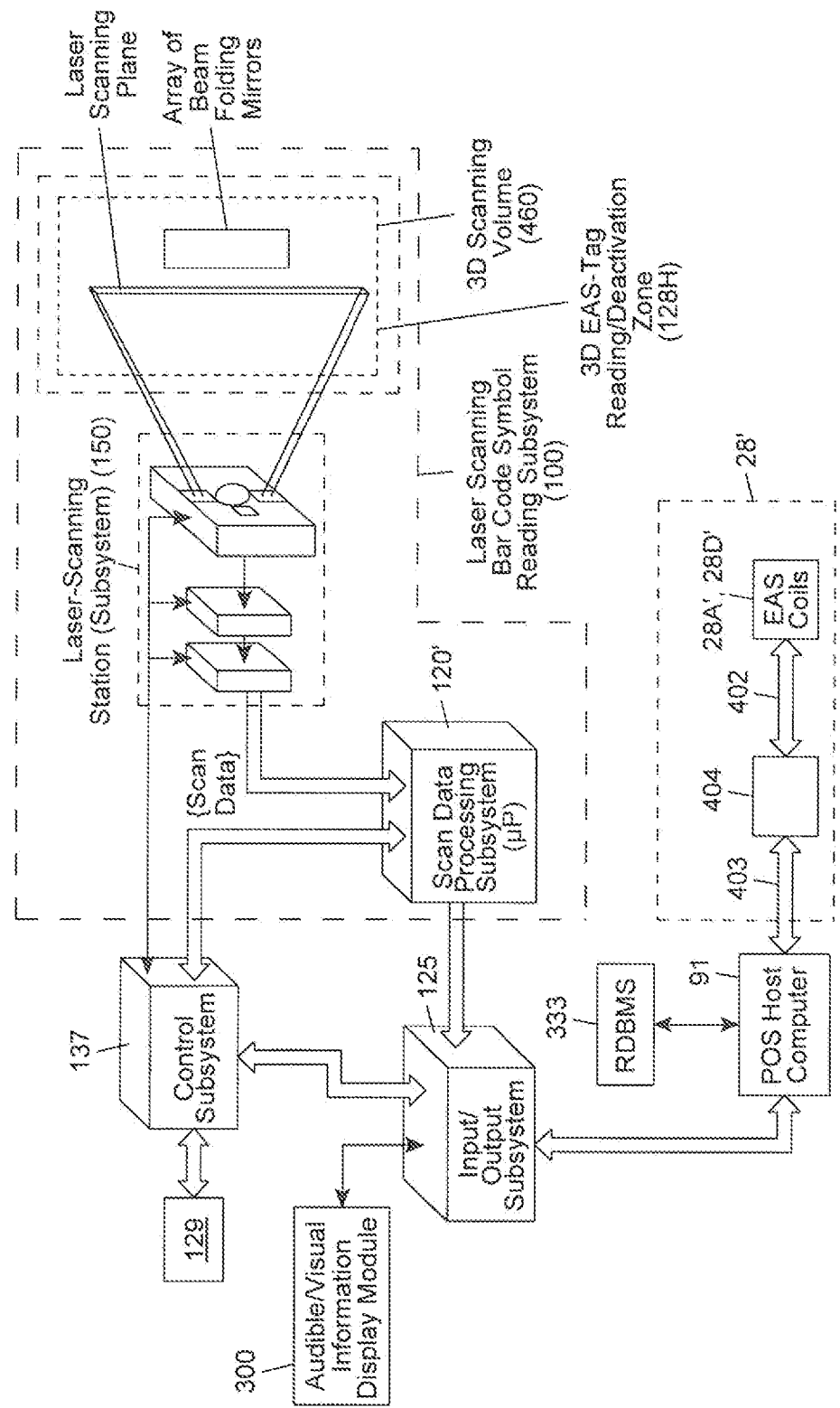
FIG. 8 is a schematic block diagram describing the major system components of the laser-scanning based bar code symbol reading system illustrated in FIGS. 6A through 7.

As shown in FIG. 8, the laser-scanner code symbol reading subsystem 100 comprises: a hand-supportable housing 2 (2A, 2B) having a light transmission window covered by an optically transparent window or faceplate 3, and a base portion capable of being supported on a countertop surface; a laser scanning engine (i.e. subsystem) 150 and array of pattern forming mirrors, disposed in the housing, for generating and projecting a complex of laser scanning planes through the light transmission window, and into the 3D scanning volume 460 of the subsystem, defined externally with respect to the light transmission window; a scan data processing subsystem 120 for supporting automatic processing of scan data collected from each laser scanning plane in the system; an input/output subsystem 125 for interfacing with the image processing subsystem; a control subsystem 137; an electronic article surveillance (EAS) subsystem 28', disposed completely outside of the system housing, for generating an EAS tag deactivation field and EAS tag reading/detecting field, under the control of the PC host computer 91; ultra-thin EAS-enabling faceplate bezel 500, supporting antenna coils 28B', 28D' and cable interface circuit 28F' on the flexible PC substrate, and having an base portion that allows a flexible EAS cable 402 to pass beneath the system and piggy-back onto the scanner cable assembly 10 provided in the lower rear portion of the bar code symbol reader, and interfaces to module 404, as shown; a system memory 129 for storing data implementing system configuration parameters (SCPs) and the like; and an audible/visual information display subsystem (i.e. module) 300 for visually and/or audibly displaying various types of indications to the system operator carrying out scanning and checkout operations.

The primary function of the laser scanning subsystem 150 is (i) to scan code symbols on objects using laser beams, (ii) collect light reflected off the scanned code symbols, and (iii) generate scan data representative of the scanned code symbol.

The primary function of the scan data processing subsystem 120 is to process scan data and generate symbol character data of read or recognized code symbols.

The primary function of the input/output subsystem 127 is to support universal, standard and/or proprietary data communication interfaces with host system 91. Examples of such interfaces, and technology for implementing the same, are given in U.S. Pat. No. 6,619,549, incorporated herein by reference in its entirety.

The primary function of the manually-activatable trigger switch 5A integrated with the housing is to enable the user, during a manually-triggered mode of operation, to generate a control activation signal (i.e. trigger event signal) upon manually depressing the same (i.e. causing a trigger event), and to provide this control activation signal to the system control subsystem 137 for use in carrying out its complex system and subsystem control operations, described in detail herein.

The primary function of the system configuration parameter (SCP) table in system memory 129 is to store (in non-volatile/persistent memory) a set of system configuration and control parameters (i.e. SCCPs) for each of the available features and functionalities, and programmable modes of supported system operation, and which can be automatically read and used by the system control subsystem 137 as required during its complex operations. Notably, such SCPs can be dynamically managed as taught in great detail in co-pending US Patent No. US20080314985 A1, incorporated herein by reference.

The primary function of control subsystem 137 is to orchestrate the various subsystems in the system 100, and also process data inputs and determine that each bar-coded product scanned at the POS checkout station has been successfully purchased (i.e. paid for) and controlling the deactivation of any EAS tags applied to purchased products, and the like. While this subsystem can be implemented by a programmed microprocessor, in the preferred embodiments of the present invention, this subsystem is implemented by the three-tier software architecture supported on micro-computing platform, as described in U.S. Pat. No. 7,128,266, and elsewhere hereinafter.

In FIG. 8, the primary components of the EAS subsystem 28' are shown as comprising: a deactivation coil 28A' for generating a EAS tag deactivation field and a detection coil 28D' for generating a EAS tag detection field, both within a 3D EAS tag detection/deactivation zone 128H that spatially encompasses the 3D scanning volume 460 of the bar code symbol reading system; and the EAS signal supply and processing unit or module 404, shown in FIG. 4B, containing a discharge switch 28B, a power generation circuit 28C and a EAS tag detection circuit, 28E. As shown, module 404 also supports (i) a first interface connecting the deactivation coil 28A' and the detection coil 28D' (formed on the EAS-enabling faceplate bezel structure 500) by flexible EAS cable 402, and (ii) a second interface connecting to the host computing system 91 by flexible EAS cable 403, as shown in FIG. 6A.

The primary function of the EAS tag detection field is to automatically read EAS tags applied to priced product items, when such product items are passed through the 3D EAS tag reading/deactivation zone 460. The primary function of the EAS tag deactivation field is to automatically deactivate EAS tags applied to purchased product items, when such purchased items are passed through the 3D EAS tag reading/deactivation zone 28H during deactivation operations. The primary function of the EAS tag detecting field is to automatically detect EAS tags applied to product items as passed through the 3D EAS tag reading/deactivation zone 28H during detection operations.

Modifications That Come to Mind

The illustrative embodiments described above have shown several different classes of bar code symbol reading systems employing EAS-enabling faceplate bezel structures of various types, including ultra-thin applique-type face-bezel designs shown in FIGS. 6A through 8, where the flexible EAS cable 402 is shown running beneath the system housing 2A, 2B along the course of the flexible scanner interface cable 10 and terminating at the EAS controller 404, which can be located anywhere at the POS station. It is understood that flexible EAS cable 402 can run downward through an aperture formed in the countertop surface, to the EAS controller 404 located under the countertop of the POS station, instead of being routed along the scanner interface cable 10.

It is understood that the EAS cable 402 can be alternatively realized as a thin flexible printed circuit (PC) cable extending from the base portion 502 of the EAS-enabling faceplate bezel 500 to the EAS controller 404 located beneath the POS countertop, near the host computer system 91, or elsewhere at the POS station. This thin flexible EAS cable also can be run downward through an aperture formed in the countertop surface, to the EAS controller 404 located under the countertop of the POS station, instead of being routed along the scanner interface cable 10.

In alternative embodiments, the bar code symbol reading system can be provided with a wireless data communication interface to the POS host computer 91, by replacing the scanner interface cable 10 with a wireless data communication interface link, well known in the art. In such instances, the flexible EAS cable, however realized, can be routed to its EAS controller 404, wherever it might be installed at the POS station.

Several modifications to the illustrative embodiments have been described above. It is understood, however, that various other modifications to the illustrative embodiment will readily occur to persons with ordinary skill in the art. All such modifications and variations are deemed to be within the scope of the accompanying Claims.

What is claimed is:

1. A bar code symbol reading system for use in conjunction with an electronic article surveillance (EAS) subsystem interfaced with a host computer system, said bar code symbol reading system comprising:

a housing having a light transmission window covered by an optically transparent faceplate having outer dimensions closely matched to said light transmission window;

a bar code symbol reading subsystem, disposed in said housing, for optically reading bar code symbols on bar-coded products that are passed in front of said optically transparent faceplate, and generating symbol character data for each bar code symbol read by said bar code symbol reading subsystem;

a faceplate bezel having a front surface, a rear surface, and a rectangular shaped aperture having dimensions closely matched to the outer dimensions of said optically transparent faceplate, and a base portion which extends from a bottom portion of said faceplate bezel and has a front surface and a rear surface as well, and a recessed cavity formed in said rear surface of said base portion; and a groove formed in the rear surface of said faceplate bezel, extending all around said rectangular shaped aperture, and at a depth sufficient to recess at least a first coil of electrically conductive wire embedded in said groove, and having terminals that terminate at said recessed cavity and which are connected to an electrical interface circuit mounted within said recessed cavity;

wherein said electrical interface circuit is connected to a flexible EAS cable extending from said electrical interface circuit towards electrical drive circuitry associated with said EAS subsystem, for powering said first coil during EAS tag deactivation operations controlled by said host computer system; and wherein said first coil generates an electromagnetic EAS field in the vicinity of said optically transparent faceplate, for deactivating an EAS tag on a purchased product presented within a 3D code reading volume, during EAS tag deactivation operations.

2. The bar code symbol reading system of claim 1, wherein said EAS subsystem further comprises a second coil of electrically conductive wire embedded in said groove, and having terminals that terminate at said recessed cavity and which are connected to said electrical interface circuit; wherein said flexible EAS cable also conducts signals from said second coil to EAS tag detection circuitry operably connected to said host computer system; and wherein said second coil generates a second electromagnetic EAS field in the vicinity of said optically transparent faceplate, to detect said EAS tag on a product presented within said 3D code reading volume, during EAS tag detection operations.

3. The bar code symbol reading system of claim 1, wherein, said bar code symbol is realized using a 1D or 2D bar code symbology.

4. The bar code symbol reading system of claim 1, wherein said EAS subsystem further comprises a power generation circuit for generating a first electrical signal supplied to said first coil EAS tag deactivation operations.

5. The bar code symbol reading system of claim 1, wherein said EAS subsystem is based on physics selected from the group consisting of magneto-harmonic; magneto-strictive; and radio-frequency.

6. The bar code symbol reading system of claim 1, wherein said bar code symbol reading subsystem comprises one or more of a laser scanning bar code symbol reader and a digital-imaging bar code symbol reader.

7. The bar code symbol reading system of claim 1, wherein said housing is supportable within a hand of an operator and/or supportable on a countertop surface.

8. The bar code symbol reading system of claim 1, wherein said housing is supportable within a hand of an operator and/or supportable on a countertop surface.

9. A bar code symbol reading system for use in conjunction with an electronic article surveillance (EAS) subsystem interfaced with a host computer system, said bar code symbol reading system comprising:
   a housing having a light transmission window covered by an optically transparent faceplate having outer dimensions closely matched to said light transmission window;
   a bar code symbol reading subsystem, disposed in said housing, for optically reading bar code symbols on bar-coded products that are passed in front of said optically transparent faceplate, and generating symbol character data for each bar code symbol read by said bar code symbol reading subsystem;
   a faceplate bezel structure, realized as a printed, circuit (PC) on a flexible substrate, having a front surface, a rear surface, a bottom portion, and a rectangular shaped aperture having dimensions closely matched to the outer dimensions of said optically transparent faceplate, and a base portion which extends from said bottom portion of said faceplate bezel structure and has a front surface and a rear surface as well;
   a first coil of electrically conductive wire provided on said rear surface of said faceplate bezel structure about said rectangular shaped aperture, and having terminals that are connected to an electrical, interface circuit provided on the rear surface of said base portion;
   wherein said electrical interface circuit is connected to a flexible EAS cable extending from said electrical interface circuit towards electrical drive circuitry associated with said EAS subsystem, for powering said first coil during EAS tag deactivation operations controlled by said host computer system; and
   wherein said first coil generates an electromagnetic EAS field in the vicinity of said optically transparent faceplate, for deactivating an EAS tag on a purchased product presented within a 3D code reading volume, during EAS tag deactivation operations.

10. The bar code symbol reading system of claim 9, wherein said EAS subsystem further comprises a second coil of electrically conductive wire also provided on said rear surface of said faceplate bezel structure about said rectangular shaped aperture, and having terminals that are connected to said electrical interface circuit provided on the rear surface of said base portion; wherein said flexible EAS cable also conducts signals from said second coil to EAS tag detection circuitry operably connected to said host computer system, and wherein said second coil generates a second electromagnetic EAS field in the vicinity of said optically transparent faceplate, to detect said EAS tag on a product presented within said optically transparent faceplate, during EAS tag detection operations.

11. The bar code symbol reading system of claim 9, wherein said bar code symbol is realized using a 1D or 2D bar code symbology.

12. The bar code symbol reading system of claim 9, wherein said EAS subsystem further comprises a power generation circuit for generating a first electrical signal supplied to said first coil EAS tag deactivation operations.

13. The bar code symbol reading system of claim 9, wherein said EAS subsystem is based on physics selected from the group consisting of magneto-harmonic; magneto-strictive; and radio-frequency.

14. The bar code symbol reading system of claim 9, wherein said bar code symbol reading subsystem comprises one or more of a laser scanning bar code symbol reading subsystem and a digital-imaging bar code symbol reading subsystem.

* * * * *